US009030336B2

(12) United States Patent
Doyle (10) Patent No.: US 9,030,336 B2
(45) Date of Patent: *May 12, 2015

(54) METHOD AND APPARATUS FOR OBTAINING WEATHER INFORMATION FROM ROAD-GOING VEHICLES

(75) Inventor: Marquis D. Doyle, Clemmons, NC (US)

(73) Assignee: Omnitracs, LLC, Dallas, TX (US)

( * ) Notice: Subject to any disclaimer, the term of this patent is extended or adjusted under 35 U.S.C. 154(b) by 73 days.

This patent is subject to a terminal disclaimer.

(21) Appl. No.: 13/179,407

(22) Filed: Jul. 8, 2011

(65) Prior Publication Data

US 2012/0179375 A1    Jul. 12, 2012

Related U.S. Application Data

(63) Continuation of application No. 11/498,971, filed on Aug. 2, 2006, now Pat. No. 7,999,702.

(51) Int. Cl.
| | |
|---|---|
| G08G 1/123 | (2006.01) |
| G01W 1/00 | (2006.01) |
| G08G 1/0962 | (2006.01) |
| G08G 1/00 | (2006.01) |

(52) U.S. Cl.
CPC ............ *G01W 1/00* (2013.01); *G08G 1/0962* (2013.01); *G08G 1/20* (2013.01)

(58) Field of Classification Search
USPC ............ 340/539.1, 995.12, 995.13, 601, 602; 702/3
See application file for complete search history.

(56) References Cited

U.S. PATENT DOCUMENTS 6,603,405 B2 *  8/2003  Smith ........................... 340/905
6,654,681 B1    11/2003  Kiendl et al.
(Continued)

FOREIGN PATENT DOCUMENTS

| EP | 1207370 A1 | 5/2002 |
|---|---|---|
| EP | 1321742 A2 | 6/2003 |
| WO | 0221479 A1 | 3/2002 |

OTHER PUBLICATIONS

International Search Report—PCT/US07/074673, International Search Authority, European Patent Office, Mar. 18, 2008.
(Continued)

*Primary Examiner* — Steven Lim
*Assistant Examiner* — Hongmin Fan
(74) *Attorney, Agent, or Firm* — Arent Fox LLP (57) ABSTRACT

In one embodiment taught herein, a plurality of road-going vehicles report weather-related data to a weather-determining system. For example, trucks and/or cars having in-vehicle information systems wirelessly transmit one or more items of weather-related data, such that the weather-determining system directly or indirectly receives the transmitted data. In turn, the weather-determining system jointly processes the weather-related data to determine weather information for one or more geographic areas corresponding to reported positions of the road-going vehicles. In one embodiment, the in-vehicle information systems comprise GPS-based position reporting systems installed in on-highway trucks and other fleet vehicles, and the weather-determining system comprises a modified position-tracking system, e.g., a modified network fleet management system. Weather-related data may be collected and processed for large numbers of vehicles across many geographic areas of interest, and the resulting weather information can be fed back to the road-going vehicles and/or provided to other consumers of weather information.

15 Claims, 5 Drawing Sheets

(56) References Cited

U.S. PATENT DOCUMENTS

| | | | |
|---|---|---|---|
| 6,919,821 B1* | 7/2005 | Smith | 340/905 |
| 7,188,025 B2* | 3/2007 | Hudson, Jr. | 701/117 |
| 7,999,702 B2 | 8/2011 | Doyle, III | |
| 2001/0032120 A1* | 10/2001 | Stuart et al. | 705/11 |
| 2005/0215871 A1* | 9/2005 | Feldman et al. | 600/309 |
| 2008/0024323 A1* | 1/2008 | Kadaba | 340/905 |
| 2008/0042802 A1* | 2/2008 | Shaffer et al. | 340/7.2 |

OTHER PUBLICATIONS

Written Opinion—PCT/US07/074673, International Searching Authority—European Patent Office, Mar. 18, 2008.

* cited by examiner

METHOD AND APPARATUS FOR OBTAINING WEATHER INFORMATION FROM ROAD-GOING VEHICLES

This application is a Continuation of pending U.S. patent application Ser. No. 11/498,971 filed Aug. 2, 2006.

BACKGROUND

1. Field

The present invention relates generally to weather information, and more specifically to obtaining weather information from road-going vehicles.

2. Background

Countless numbers of trucks ply the highways every day, both in North America and elsewhere around the world. At any given moment, there may be tens, hundreds, or even thousands of trucks on the road in any given geographic area.

Increasingly, trucks and other road-going vehicles include vehicle information systems that track and report vehicle position information. Such systems generally have wireless communication links with one or more monitoring facilities, such as a centralized Network Management Center (NMC). Satellite and/or terrestrial communication networks typically provide the communication links between the in-vehicle systems and the NMCs.

Position data provides fleet operators with real-time or near real-time monitoring of route progress, and greatly aids vehicle dispatching and management operations. Concomitant benefits include increased driver safety and vehicle/load security. As one example, QUALCOMM offers comprehensive fleet management services to fleet operators, and provides a relatively rich array of in-vehicle systems and related equipment, along with the software applications and NMC services needed to exploit the collection of positional data from potentially large fleets of road-going vehicles.

However, in-vehicle data collection and corresponding aggregate data processing has not heretofore exploited richer data collection opportunities, such as weather-related data collection and processing. There is therefore a need in the art for more fully exploiting the ability to collect and process information from road-going vehicles.

SUMMARY

Embodiments disclosed herein address the above stated and other needs by reporting weather-related data from road-going vehicles to a weather-determining system that processes the data to obtain weather information. In one aspect, a method of reporting weather data from a road-going vehicle comprises determining weather-related data in conjunction with determining geographic positions of the road-going vehicle, and reporting the weather-related data for the determined geographic positions to a remote weather-determining system. By way of non-limiting example, an in-vehicle information system obtains weather-related measurements and reports such measurements directly or indirectly to the weather-determining system, such as by satellite or cellular communication links.

Correspondingly, in another aspect disclosed herein, a method of determining weather information comprises receiving weather-related data from a plurality of road-going vehicles, and processing the weather-related data to determine weather information for one or more geographic areas corresponding to reported positions of the road going vehicles. Such processing comprises, for example, joint processing wherein weather-related data reported by multiple road-going vehicles for the same or similar times and geographic areas are processed together. By way of non-limiting example, weather-related data collected for the same times and areas are processed together by the weather-determining system to obtain statistically reliable weather information. However determined, the resulting weather information can be fed back to the road-going vehicles and/or provided to other consumers of weather information on subscription or on-demand basis.

As another non-limiting example, the weather-determining system may comprise a suitably modified position-tracking system, such as may be pre-existing at a network-based fleet management center. Complementing such aspects, the in-vehicle information systems providing weather-related data reports may comprise suitably modified, in-vehicle position-tracking systems, such as would be installed in long-haul trucks and other highway vehicles. Indeed, in one or more aspects taught herein, existing vehicle sensor data and other information is exploited to measure or infer weather data in a road-going vehicle, such that existing position-tracking and other types of in-vehicle information systems may be configured to report weather-related data without need for adding additional sensors, etc. However, sensors may be added as needed or desired.

Of course, the present invention is not limited to the above features and advantages. Those skilled in the art will recognize additional features and advantages upon reading the following detailed description, and viewing the accompanying drawings.

DETAILED DESCRIPTION

Figure 1:
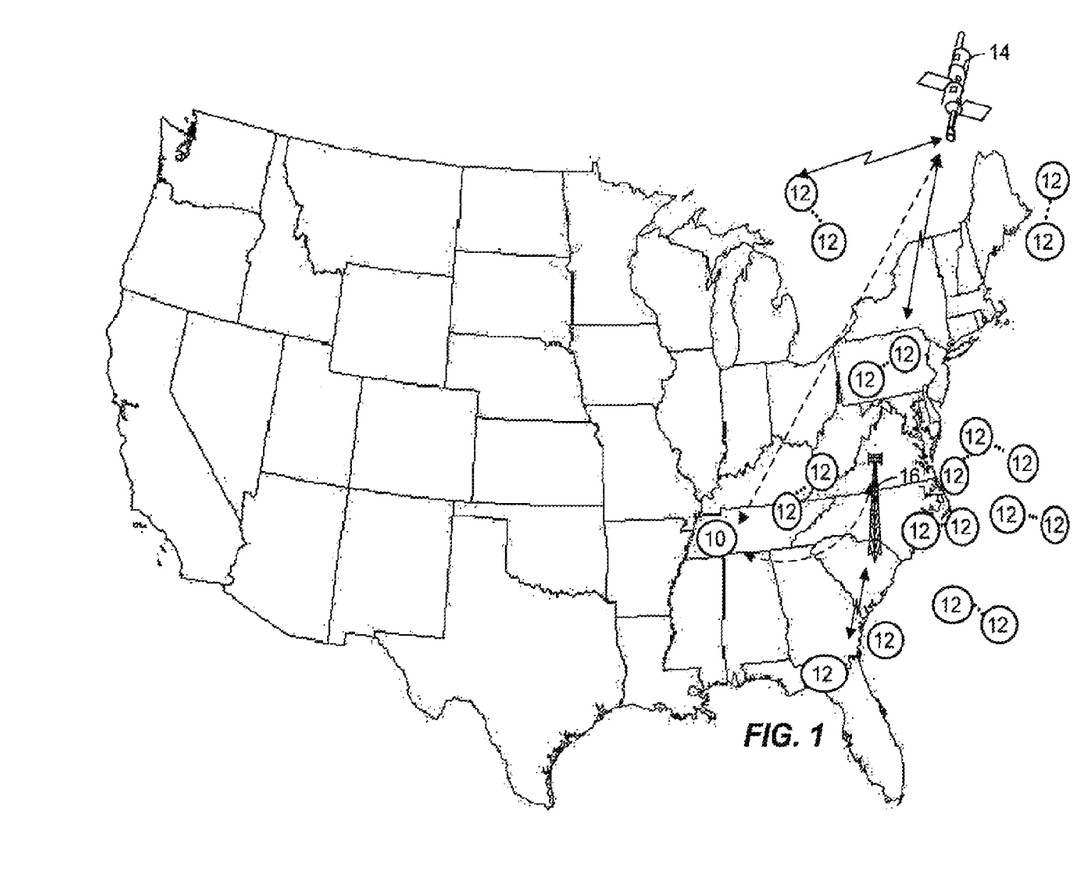
FIG. 1 is a block diagram of one embodiment of a weather-determining system having direct or indirect communication links with a number of road-going vehicles in one or more geographic areas.

FIG. 1 illustrates a weather-determining system 10 having direct or indirect communication links to a plurality of road-going vehicles 12 that are configured to report weather data to the weather-determining system 10. In turn, the weather-determining system 10 processes the reported weather data to determine weather information for one or more geographic regions. For example, by exploiting reported weather data from the tens, hundreds, or even thousands of road-going vehicles 12 in any given geographic area of the world—city, county, etc.—the weather-determining system 10 can determine statistically reliable and richly detailed weather information for that given area. Effectively, the plurality of road-going vehicles 12 operate as a distributed system of thousands or hundreds of thousands of rolling weather stations providing real-time or near real-time weather data.

The road-going vehicles 12 may be individually owned vehicles and/or commercial or private fleet vehicles. In general, each of the road-going vehicles includes a vehicle information system, such as a GPS tracking system, vehicle telematics system, etc. For example, in one or more embodiments, at least some of the road-going vehicles 12 are commercial or private fleet trucks equipped with communicatively linked position-tracking systems, e.g., a GPS-based tracking and reporting system, such as a version of QUALCOMM's OMNITRACS mobile tracking and communication system for fleet management. In the same or other embodiments, at least some of the vehicles may be privately owned cars or other light duty vehicles equipped with a vehicle telematics system, such as ONSTAR.

Each road-going vehicle 12 has persistent or non-persistent communication links to the weather-determining system 10. For example, some types of in-vehicle information systems include satellite-based communication modules—satellite data modems—that provide persistent connections between a road-going vehicle 12 and the remote weather-determining system 10 via one or more satellites 14. Other types of in-vehicle information systems additionally or alternatively use terrestrial communication links, such as cellular communication links via one or more private or commercial cellular networks 16. In any case, this discussion assumes that individual ones of the road-going vehicles 12 have some means of reporting weather-related data directly or indirectly to the weather-determining system 10.

Figure 2:
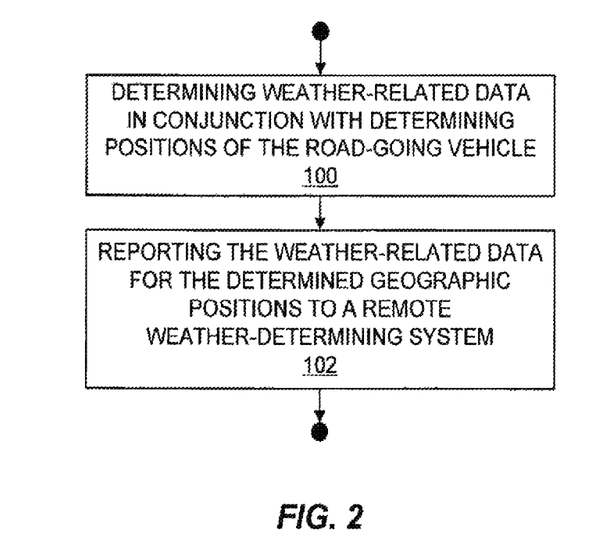
FIG. 2 is a logic flow diagram of one embodiment of processing logic for an in-vehicle information system configured to provide weather data from a road-going vehicle to a remote weather-determining system.

In that context, FIG. 2 illustrates one embodiment of processing logic for an in-vehicle information system configured to provide weather data from a road-going vehicle 12. Those skilled in the art will appreciate that the illustrated processing logic may be embodied in hardware, software, or any mix thereof, and may represent just one of potentially many processing tasks being carried out sequentially or concurrently. In one example, the illustrated processing logic executes on a timed interval, such as every minute, every five minutes, etc. Also, those of skill will appreciate that the processing logic illustrated in FIG. 2, and in other logic or processing flow diagrams discussed herein, does not necessarily imply a fixed order. Thus, in at least some cases, the illustrated method steps or actions can be interchanged without departing from the present invention.

With the above points in mind, the illustrated processing "begins" with determining weather-related data in conjunction with determining positions of the road-going vehicle (Step 100). This processing step reflects the general need to correlate collected weather data with the corresponding geographic location. Given that the in-vehicle information system collecting such weather data may be a suitably modified GPS-based vehicle tracking system, such geographic location is readily available and, likely, is already being reported to a remote tracking system on a regular or as-needed basis.

Thus, processing continues with reporting the weather-related data for the determined geographic positions to a remote weather-determining system (Step 102), e.g., the weather-determining system 10. In one embodiment, weather-related data is collected at a first time interval, locally stored, and then batch-reported at second, longer time interval. In another embodiment, weather-related data is reported at the collection rate, e.g., every minute, every five minutes, etc. Those skilled in the art will appreciate that such details can be varied depending on, for example, the economics of frequent but short reports versus less frequent but longer reports, local data storage capabilities, and the desirability of having real-time or near real-time weather-related data at the weather-determining system 10. Further, at least some of the road-going vehicles 12 may use different reporting intervals and even different report types/formats.

Figure 3:
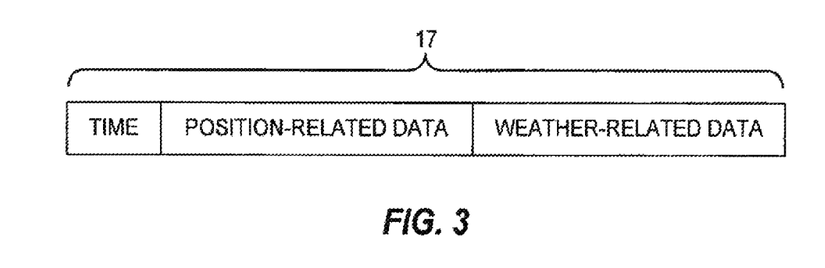
FIG. 3 is a diagram of one embodiment of a weather data message reported by an in-vehicle information system to a remote weather-determining system.

FIG. 3 illustrates one embodiment of a weather data report message 17 sent by a road-going vehicle 12, wherein corresponding time and position-related data accompany weather-related data from one or more collection intervals. In this way, the weather-determining system 10 receives one or more items of weather-related data, along with corresponding time-stamp and geographic position data. In at least one embodiment, one or more of the road-going vehicles 12 send Mobile Initiated Position Reports (MIPRs) according to a desired reporting interval, e.g., every five minutes. According to one or more embodiments taught herein, MIPRs are used to convey weather-related data to the weather-determining system 10.

Note that weather-related data may be added to every MIPR reported by a given road-going vehicle 12, or to selected MIPRs. In such contexts, and in general, reducing or minimizing the amount of data needed to convey the weather-related data yields communication advantages. Limiting the number of different parameters collected and reported as weather-related data represents one solution for controlling communication bandwidth and/or on-air time. Of course, various data compression techniques may be used, depending upon the overall economics of the communication links, and on the capabilities of the in-vehicle information systems, which could differ among vehicles.

Figure 4:
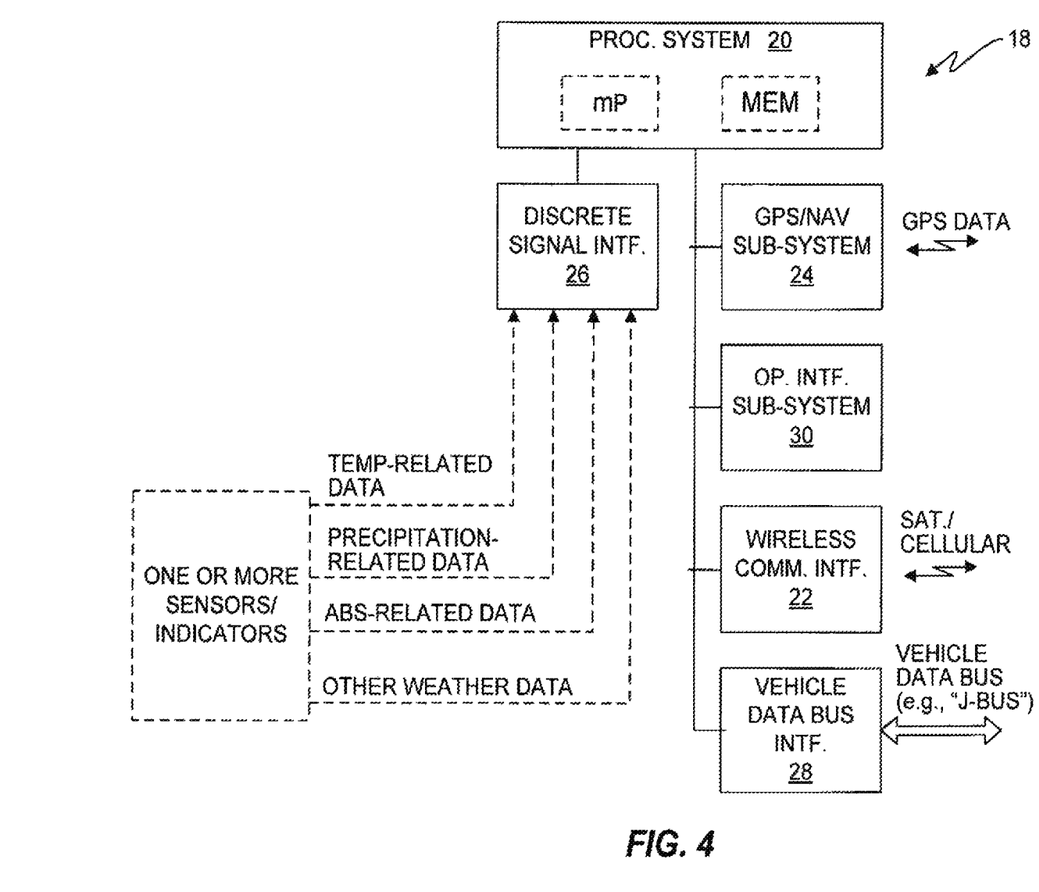
FIG. 4 is a block diagram of one embodiment of an in-vehicle information system configured to provide weather data from a road-going vehicle to a remote weather-determining system.

FIG. 4 illustrates one embodiment of a in-vehicle information system 18 that is configured for installation in a road-going vehicle 12, and configured to report weather-related data to a remote weather-determining system 10. The illustrated in-vehicle information system 18 comprises a processing system 20, also referred to as a Mobile Application Server or "MAS." In one embodiment, the processing system 20 comprises a computer system having one or more microprocessors and associated memory, and is configured to run WINDOWS CE or some other suitable operating system, such as LINUX, QNX, etc. Further, the processing system 20 generally is provisioned with one or more application programs, providing position-tracking functions, navigation assistance, driver information and communication functions, along with weather-data collection and reporting functions.

In support of these and other functions, the in-vehicle information system 18 further includes or is associated with a number of other sub-systems and interfaces. In the illustrated embodiment, the in-vehicle information system 18 includes or is associated with one or more wireless communication interfaces 22, which may include a Satellite Data Modem (SDM) and/or a cellular communications transceiver, a GPS/Navigation sub-system 24, a discrete signal interface 26, a vehicle data bus interface 28, and an operator interface 30, also referred to as a Mobile Display Unit or "MDU."

The one or more wireless communication interfaces 22 provide direct or indirect communication links to the remote weather-determining system 10, and such links may be persistent or non-persistent. These communications links also may provide for incoming data feeds, such as various driver information feeds.

Of course, to report weather-related data, the in-vehicle information system 18 first must collect such data via one or more corresponding measurements. In one embodiment, in-vehicle information system 18 includes or is associated with a number of relevant sensors, e.g., one or more of a temperature sensor, a precipitation sensor, a humidity sensor, and a barometric pressure sensor. Such sensors may be analog, digital, or any mix thereof, and the discrete signal interface 26 is configured accordingly, i.e., to receive the corresponding analog or digital signals. In one embodiment, the discrete signal interface 26 provides digital data to the processing system 20 corresponding to discrete weather-data input signals.

Of course, there are monetary and practical disadvantages associated with requiring the road-going vehicles 12 to carry dedicated weather-sensing equipment. Indeed, one or more embodiments taught herein exploit indirect (inferential) sensing of weather-related data and/or make advantageous use of sensor information already available on the typical road-going vehicle 12. In one example of inferential sensing of weather-related data, the discrete signal interface 26, or the vehicle data bus interface 28, is configured to receive windshield wiper speed data, e.g., on/off, fast/slow/intermittent, etc. In turn, the processing system 20 infers precipitation-related data from the wiper speed information.

Inferential sensing also may include the sensing of Antilock Braking System (ABS) related data, which is relevant to sensing icing and other slick/hazardous road conditions. In one embodiment, the discrete signal interface 26 receives ABS-related data. For example, the same discrete signal used to activate a dashboard or other driving-warning indicator regarding ABS activity can be sensed via the discrete interface 26 as an indication of ABS activity. In another embodiment, the in-vehicle information system 18 receives ABS-related data via the vehicle data bus interface 28. Notably, in at least one embodiment, the in-vehicle information system 18 receives temperature-related data, precipitation-related data (e.g., wiper speed data), and ABS/braking-related data, and thereby supports relatively rich inferential-based weather information determination by the weather-determining system 10.

In other words, at least one embodiment of the in-vehicle information system 18 as taught herein adds weather-related data reporting capabilities to a given road-going vehicle 12, while requiring little or no new wiring and no added sensors. For example, most late-model vehicles include sophisticated engine and vehicle management systems, which provide accurate ambient temperature sensing. These already-available temperature measurements can be provided to the in-vehicle information system 18 via the vehicle bus data interface 28, for use in weather-related data reporting. Likewise, many engine management and/or driver information systems monitor humidity, and other parameters relevant to weather conditions, and any or all such data may be routed to the in-vehicle information system 18, which may pass along such data via its reporting capabilities, or pre-process such data as needed or desired for weather-related data reporting.

In at least one particular embodiment taught herein, the vehicle data bus interface 28 comprises a "J-BUS" interface, wherein "J-BUS" denotes the heavy vehicle data bus standards promulgated by the Society of Automotive Engineers, more commonly known as the "SAE." For example, the vehicle data bus interface 28 can be configured to monitor for temperature and other weather-related data messages in accordance with the J1587 standard, which defines J-BUS message types and formats. (Note that very accurate ambient temperature readings may be obtained by receiving inlet engine air temperature readings via the J-BUS or other truck data bus, as most trucks "snorkel" fresh air from outside their engine compartments.)

Of course, differently configured vehicle data bus interfaces 28 can be provided and used, as needed for different types of road-going vehicles 12. That is, the configuration of the in-vehicle information system 18 may be different for a passenger car or light-duty truck installation, than it would be for a long-haul trailer tractor installation. However, those skilled in the art will appreciate that all or most of the configuration variations of the in-vehicle information systems 18 may be transparent to the weather-determining system 10.

In at least one embodiment, the weather-determining system 10 comprises a network management center processing system. Thus, the weather-determining system 10 may comprise a modified version of a pre-existing fleet management processing system already having vehicle position tracking, route monitoring, and overall fleet management capabilities.

Figure 5:
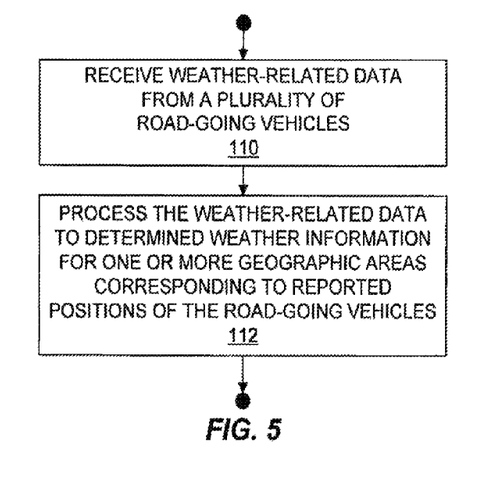
FIG. 5 is a logic flow diagram of one embodiment of processing logic for a weather-determining system configured to determine weather information based on receiving weather data from a plurality of road-going vehicles.

Whether implemented as a standalone system, or integrated with a pre-existing fleet management system, FIG. 5 illustrates one embodiment of processing logic for the weather-determining system 10. Such processing may represent a small part of a larger, overall processing routine, and may be implemented in hardware, software, or any combination thereof.

With those points in mind, weather information processing "begins" with receiving weather-related data from a plurality of road-going vehicles 12 (Step 110). Operations continue with the weather-determining system 10 processing the received weather-related data to determine weather information for one or more geographic areas corresponding to the reported positions of the road-going vehicles 12 (Step 112).

Figure 6:
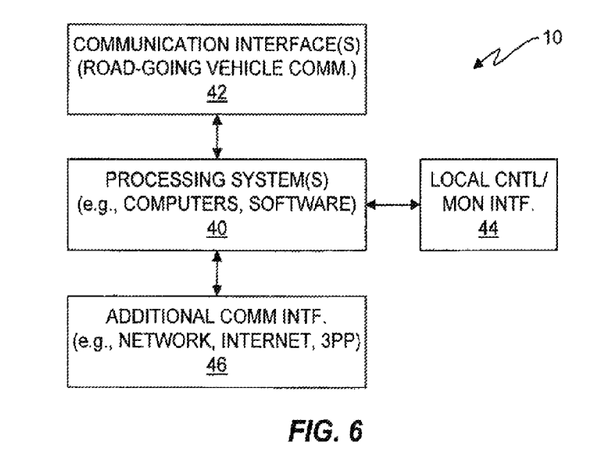
FIG. 6 is a block diagram of one embodiment of a weather-determining system configured to determine weather information based on receiving weather data from a plurality of road-going vehicles.

Complementing the processing of FIG. 5, FIG. 6 illustrates one embodiment of the weather-determining system 10, which, again, may comprise all or part of a network management center processing system that is also configured for vehicle position tracking, route monitoring, and other fleet management operations. In any case, the illustrated weather-determining system 10 comprises one or more processing systems 40, one or more communication interfaces 42, local control and monitoring interfaces 44, and one or more additional communication interfaces 46.

In at least one embodiment, the communication interfaces 42 provide direct or indirect communication links to the satellite and/or cellular based communications of the road-going vehicles 12. Such links may include one or more satellite ground station connections, one or more cellular network connections, and/or Internet or other data network connections. Further, the additional communication interfaces 46, which may be integrated with or share resources with the communication interfaces 42, can be configured to provide communications with, for example, third-party providers of weather information, and with other would-be consumers of the weather information determined by the weather-determining system 10.

Indeed, in one embodiment, the weather-determining system 10 is configured to provide one or more weather information output feeds. Such feeds can be sent back to all of the road-going vehicles, or at least to targeted road-going vehicles. For example, the weather-determining system 10 can be configured to determine the relevancy of weather information for a given geographic region, with respect to given ones of the road-going vehicles. Such relevancy may be determined for any given road-going vehicle 12 based on its current location, its known or reported route information, its current or last-reported speed, direction, etc. In at least one embodiment, the weather-determining system 10 is provisioned with subscriber information, identifying individual vehicle owners and/or vehicle fleet owners that are subscribed to weather information services, and the weather-determining system 10 provides relevant weather information feeds directly or indirectly to the in-vehicle information systems 18 of the subscribers' vehicles 12.

Further, the weather-determining system 10 may be configured to provide one or more weather information feeds to third-party providers of weather information, such as TELEATLAS, and various national and local weather and news organizations, e.g., radio and television news organizations. In at least one such embodiment, an operator of the weather-determining system sells subscription and/or on-demand access to one or more weather information feeds provided by the weather-determining system 10. Such feeds generally will be tailored to a given target audience, which may be determined by geographic region of interest, and/or activities of interest.

Moreover, the weather-determining system 10 may determine weather information for all geographic areas from which it receives weather-data reports, or it may confine its weather information determination processing to one or more selected geographic areas of particular interest. Similarly, it may perform weather information determination on a more detailed, or on a more frequently updated basis for some geographic areas, as compared to others.

For example, the weather-determining system 10 can be configured to recognize developing severe weather patterns and/or to recognize other anomalies, such as unusually low reported highway speeds, areas associated with natural disasters, etc. Further, the weather-determining system 10 may be configured to vary its weather-determining processing for given geographic areas based on time-of-day, and/or based on the number of actively reporting road-going vehicles 12 within any given geographic area. As one example of this latter processing modification, the weather-determining system 10 may be configured to perform relatively frequent or relatively richly detailed weather information determination for a geographic area having a relatively large number of reporting vehicles 12. Conversely, the weather-determining system 10 would perform relatively infrequent or relatively basic weather information determination for a geographic area having a relatively small number of reporting vehicles 12.

In such contexts, the definitions of "large" and "small" vehicle numbers may be set according to statistical processing considerations. For example, the determination that it is or is not raining in a given geographic area, or the determination of how hard it is raining in that area, may be made according to a desired statistical confidence level only if a minimum sample set size of reporting vehicles 12 is in that particular area. Statistical reliability thus may be determined based on the sample set size. Additionally, or alternatively, statistical reliability may be determined based on evaluating the consistency or disparity in the weather-related data reported from a given area. Of course, in one or more embodiments, the weather-determining system 10 can be configured to determine weather information using whatever reported weather-data is available, but to mark or otherwise indicate the reliability or confidence level associated with such weather information as a function of the number of vehicles 12 involved in reporting the underlying weather-related data.

Figure 7:
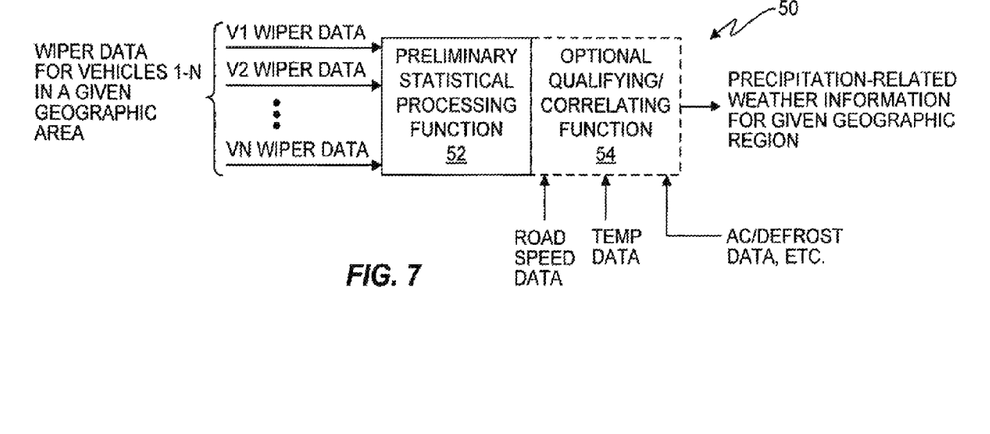
FIG. 7 is a block diagram of one embodiment of functional processing logic for determining precipitation-related weather information based on processing wiper speed information from a plurality of road-going vehicles.

FIG. 7 illustrates functional processing elements configured for a particular embodiment of weather-related data processing by the weather-determining system 10. Specifically, a precipitation-related weather information processing function 50 includes a preliminary statistical processing function 52, and an optional qualification/correlation processing function 54.

In overall terms, the processing function 50 is configured to determine precipitation-related weather information based on receiving wiper speed data as all or part of the weather-related data reported by a given number of road-going vehicles 12 in a given geographic area—illustrated as wiper data from vehicles V1 through VN. (Note that the same function, or duplicates of this function, process similar data reported for other geographic areas, and further note that the processing system 40 of the weather-determining system 10 may execute multiple other weather data processing functions.)

In one embodiment, the preliminary statistical processing function 52 performs statistical processing of the wiper data, such as by performing a majority vote decision related to the number of vehicles 12 reporting wiper on versus wiper off conditions. Additionally, or alternatively, it may evaluate how many vehicles 12 report wiper speeds at or above one or more thresholds, and it may use time-based weighting of the reported speeds to generate precipitation-related weather information as an aggregate of the individually reported wiper speed data.

Further, the processing function 50 may include, or selectively activate, optional qualification/correlation processing via the illustrated qualification/correlation processing function 54, or alternatives thereof. As just one example, the processing function 50 may qualify or further nuance the wiper speed data by correlating such data with related reported data, such as reported road speeds and temperature. Road speed, for example, serves as a secondary indicator of rain and its severity. Temperature, on the other hand, does not necessarily indicate anything about the severity of precipitation, but in combination with precipitation-related data provides a basis for the weather-determining system 10 to infer snow and icing conditions. Notably, ABS-related data provides an alternative or additional data item that can be used in conjunction with received ambient temperature data and wiper speed data, to more accurately infer freezing precipitation and/or hazardous road conditions.

Figure 8:
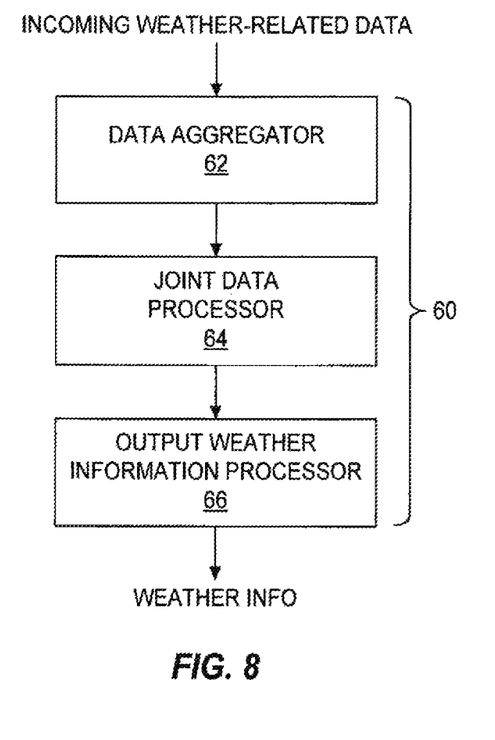
FIG. 8 is a block diagram of one embodiment of functional processing logic for determining weather information from weather data reported by a plurality of road-going vehicles.

As a more general example of weather-data processing, FIG. 8 depicts a computer program 60, such as may be used to implement the desired weather information determination functions in the one or more processing systems 40 of the weather-determining system 10. Momentarily referring back to FIG. 7, it will be understood that the computer program 60 may implement the processing functions of FIG. 7.

In any case, FIG. 8 illustrates a data aggregator 62, which pre-processes the incoming weather-related data, such that it is broken out by geographic area of interest, and, optionally, broken out by report type and/or data types. In turn, a joint data processor 64 jointly processes the weather-related data, as aggregated by the data aggregator 62 for one or more geographic areas of interest. An output weather information processor 66 may be configured to format all or part of the determined weather information for output as weather information feeds, such as to third party providers, return feedback to selected ones of the road-going vehicles 12, etc. As such, one embodiment of the output weather information processor 66 functionally interfaces with the communication interfaces 42 and/or additional communication network interfaces 46 depicted in FIG. 6.

The reliability and detail of such weather information is enhanced by joint data processing. Joint data processing may involve, for example, processing one or more like items of weather-related data collected from the same given geographic area, over the same or similar time periods. Thus, joint processing may entail collectively processing reported temperatures collected from different ones of the road-going vehicles 12, for the same time frame and geographic area, to obtain an average temperature reading for the area. Additionally, or alternatively, such data may be jointly processed to identify temperature deviations and gradients across the area, rates of change, etc.

Of course, one or more embodiments of joint weather-related data processing comprise or otherwise include the statistical processing and optional qualification/correlation processing described earlier herein. Indeed, those skilled in the art will appreciate that the teachings herein contemplate multiple variations of weather-related data processing and subsequent weather information output by the weather-determining system 10. Similarly, the teachings herein contemplate multiple variations of in-vehicle information systems 18, and the associated types and amounts of weather-related data reported from the road-going vehicles 12.

As further points of flexibility, those of skill in the art would understand that information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Thus, with all of the above points regarding implementation flexibility in mind, the foregoing description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. As such, the present invention is not limited by the foregoing discussion, or by the accompanying drawings. Indeed, the present invention is limited only by the following claims and their legal equivalents.

What is claimed is:

1. A method of determining weather information comprising:
   receiving weather-related data from a plurality of road-going vehicles; and
   processing the weather-related data to determine weather information for one or more geographic areas corresponding to reported positions of the road-going vehicles, wherein the processing includes processing of vehicle equipment operation data based on a desired statistical confidence level and a minimum sample set size of road-going vehicles being included in the plurality of road-going vehicles, and
   wherein the processing further comprises using time-based weighting of reported windshield wiper speeds to generate precipitation-related weather information as an aggregate of individually reported wiper speed data.

2. The method of claim 1, wherein processing the weather-related data to determine weather information for one or more geographic areas corresponding to reported positions of the plurality of road-going vehicles comprises jointly processing the weather-related data received from two or more road-going vehicles for a given geographic area to determine statistically reliable weather information for that given geographic area.

3. The method of claim 1, wherein processing the weather-related data to determine weather information for one or more geographic areas corresponding to reported positions of the road going vehicles comprises statistically processing one or more like items of weather-related data collected for a same geographic area by two or more of the plurality of road-going vehicles, to thereby determine statistically reliable weather information for that geographic area.

4. The method of claim 1, wherein receiving weather-related data from a plurality of road-going vehicles comprises receiving the weather-related data at a network management center having persistent or non-persistent communication links with the plurality of road-going vehicles.

5. The method of claim 1, wherein receiving weather-related data from a plurality of road-going vehicles comprises receiving reports from the plurality of road-going vehicles that include position-related data and corresponding weather-related data.

6. The method of claim 1, wherein receiving weather-related data from a plurality of road-going vehicles comprises generally receiving periodic mobile initiated position reports (MIPRs) from each road-going vehicle, wherein the MIPRs include one or more items of weather-related data in addition to position-related data.

7. The method of claim 1, wherein receiving weather-related data from a plurality of road-going vehicles comprises, for a given one of the road-going vehicles, receiving one or more of temperature-related data and precipitation-related data.

8. The method of claim 7, wherein receiving one or more of temperature-related data and precipitation-related data comprises receiving ambient temperature readings obtained from a vehicle-based information system.

9. The method of claim 7, wherein receiving one or more of temperature-related data and precipitation-related data comprises receiving wiper speed information obtained from a vehicle-based information system, and inferring a precipitation condition from the wiper speed information.

10. The method of claim 1, wherein receiving weather-related data from a plurality of road-going vehicles comprises receiving wiper speed data from one or more road-going vehicles in a given geographic area, and wherein processing the weather-related data to determine weather information for one or more geographic areas corresponding to reported positions of the road-going vehicles comprises inferring precipitation conditions for the given geographic area based on the wiper speed data.

11. The method of claim 1, wherein receiving weather-related data from a plurality of road-going vehicles comprises receiving ambient temperature data and wiper speed data from one or more road-going vehicles in a given geographic area, and wherein processing the weather-related data to determine weather information for one or more geographic areas corresponding to reported positions of the road going vehicles comprises inferring freezing precipitation conditions, or a risk thereof, for the given geographic area based on the ambient temperature data and the wiper speed data.

12. The method of claim 1, wherein receiving weather-related data from a plurality of road-going vehicles comprises receiving ambient temperature data, wiper speed data, and Antilock Braking System (ABS) data from one or more road-going vehicles in a given geographic area, and wherein processing the weather-related data to determine weather information for one or more geographic areas corresponding to reported positions of the road going vehicles comprises inferring freezing precipitation conditions, or a risk thereof, for the given geographic area based on the ambient temperature data, the ABS data, and the wiper speed data.

13. The method of claim 1, wherein receiving weather-related data from a plurality of road-going vehicles includes receiving Antilock Braking System (ABS) related data from one or more road-going vehicles in a given geographic area, and wherein processing the weather-related data to determine weather information for one or more geographic areas corresponding to reported positions of the road-going vehicles comprises inferring hazardous road conditions for the given geographic area based at least in part on the ABS related data.

14. The method of claim 1, wherein processing the weather-related data to determine weather information for one or more geographic areas corresponding to reported positions of the plurality of the road-going vehicles comprises jointly processing the weather-related data received from two or more road-going vehicles for a given geographic area and evaluating consistency or disparity in the collected weather-related measurements to determine statistically reliable weather information for that given geographic area.

15. The method of claim 1, further comprising providing one or more weather information output feeds to at least one of the road-going vehicles, wherein the weather information output feeds indicate the determined weather information for at least one of the one or more geographic areas.

* * * * *